J. R. MEYERS.
PROCESS OF MAKING CHEESE.
APPLICATION FILED APR. 11, 1921.
1,415,943.
Patented May 16, 1922.
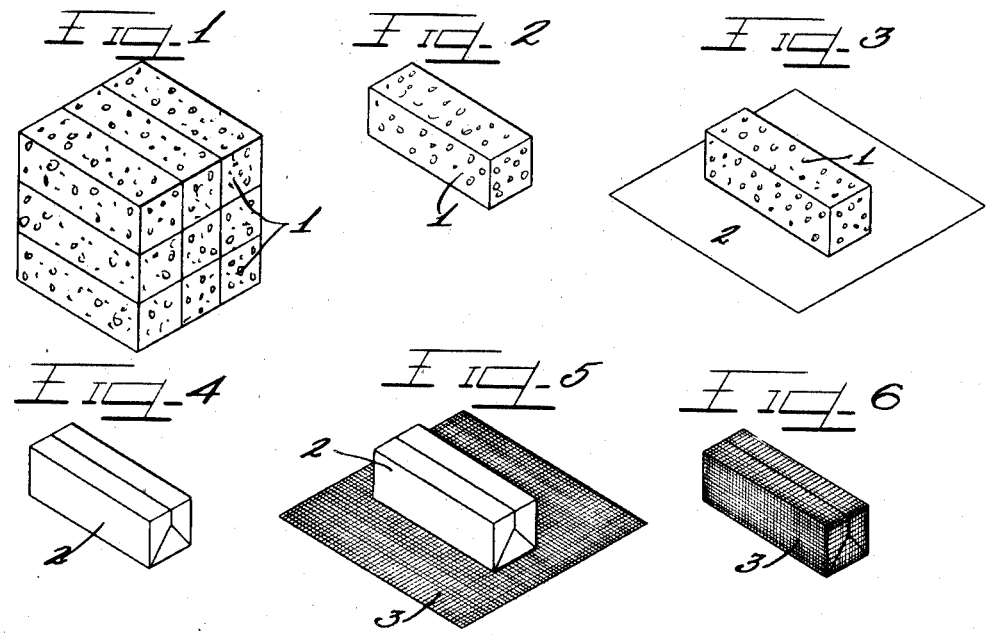
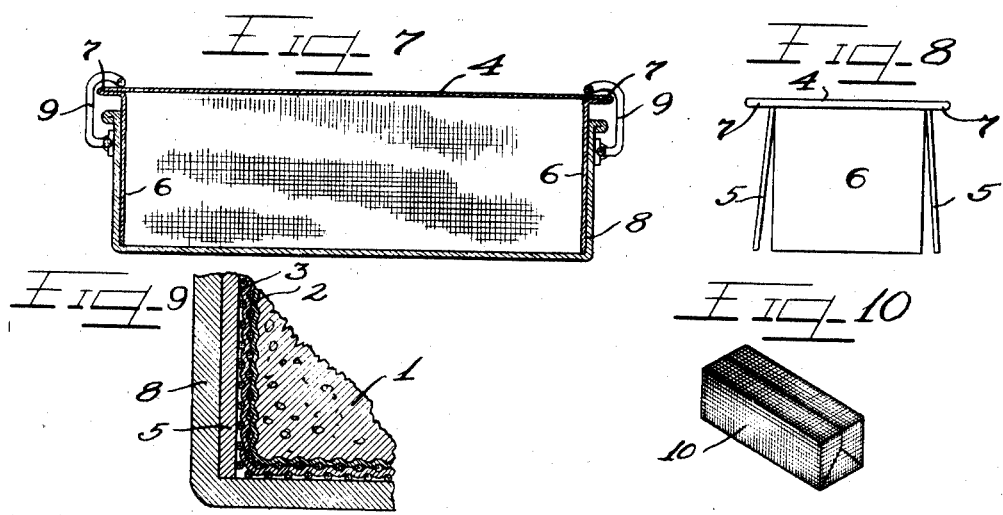

UNITED STATES PATENT OFFICE.

JULIUS R. MEYERS, OF GLENCOE, ILLINOIS.

PROCESS OF MAKING CHEESE.

1,415,943.  Specification of Letters Patent.  Patented May 16, 1922.

Application filed April 11, 1921. Serial No. 460,549.

*To all whom it may concern:*

Be it known that I, JULIUS R. MEYERS, a citizen of the United States, and a resident of the city of Glencoe, in the county of Cook and State of Illinois, have invented certain new and useful Improvements in a Process of Cheese Making; and I do hereby declare that the following is a full, clear, and exact description of the same, reference being had to the accompanying drawings, and to the numerals of reference marked thereon, which form a part of this specification.

It has been customary in cheese making to wrap a cheese in cloth and then paraffin the wrapped cheese, while by another method a cheese is first wrapped in cloth which is then removed to permit the cheese to be paraffined. In both of the above mentioned cases a rind forms on the cheese which means a substantial waste of cheese.

This invention relates more particularly to an improved process of cheddar cheese making wherein cheeses of predetermined sizes are wrapped in such a manner that there is no resultant rind or waste.

It is an object of this invention to provide a process of cheese making by cutting a piece of cheese of a predetermined size from a large block of green cheese and wrapping said piece of cheese in tin foil covered with cloth, after which the wrapped cheese is subjected to pressure and heat to produce a finished cheese without a rind.

Another object of the invention is to so wrap and treat a cheese to pressure and heat to obviate the formation of a rind on the cheese.

It is an important object of this invention to provide a simple and effective process whereby cheeses of predetermined sizes may be produced without a rind, thereby obviating waste.

It is also an important object of the invention to apply a metallic coating or covering to the surfaces of the cheese with pressure to render the same closely adherent thereby sealing the surfaces from atmospheric or other influences that tend to induce deterioration.

Other and further important objects of this invention will be apparent from the disclosures in the specification and drawings.

The invention (in a preferred form) is illustrated in the drawings and hereinafter more fully described.

On the drawings:

Figure 1 is a perspective view of a large block of cheese cut into pieces of predetermined size.

Figure 2 is a perspective view of a piece or small block of cheese cut from the large block of cheese.

Figure 3 illustrates the piece of cheese resting on a sheet of tin foil.

Figure 4 is a perspective view of the piece of cheese wrapped in the sheet of tin foil.

Figure 5 shows the wrapped piece of cheese placed upon a piece of cloth.

Figure 6 is a perspective view of the wrapped piece of cheese wrapped in the cloth.

Figure 7 illustrates a longitudinal vertical section through a mold having a wrapped piece of cheese compressed therein.

Figure 8 is an end elevation of the upper member or cover of the mold removed from the lower mold member.

Figure 9 is an enlarged fragmentary detailed section through the lower end portion of the filled mold.

Figure 10 is a perspective view of the finished cheese within its metallic coating or covering.

As shown on the drawings:

Figure 1 illustrates a large block of green cheese cut into a plurality of bricks or pieces 1 of predetermined size. Each piece of cheese 1 is first wrapped in a sheet of tin foil 2 and then wrapped in a piece of muslin or cheese cloth 3. The piece of cheese with the double wrapping is placed within an inner or top mold section comprising a top plate 4 and side walls 5 and end walls 6. The side walls 5 and the end walls 6 are integrally connected to the margins of the top plate 4 by folded spring flanges 7. The spring flanges 7 normally act to hold the side and end walls 5 and 6 respectively sprung outwardly in release position as illustrated in Figure 8.

With a wrapped piece of cheese engaged within the top mold section the side and end walls 5 and 6 are pressed inwardly to permit the top section to be slidably engaged in a lower or base mold section 8. Pivotally attached to the end walls of the base mold section 8 are a pair of clamping hooks 9. The cheese block is thicker than the depth of the mold to permit the desired compression of the cheese in closing the mold. Applying pressure to the top mold section said section is caused to telescope into the base section 8, thereby compressing the wrapped piece of cheese, at a preferably rather high pressure. The hooks 9 are swung upwardly when the cheese is fully pressed to engage over the end flanges 7 of the top mold section which is thus held clamped in position. The wrapped cheese is thus compressed into the mold to a predetermined size which is equal to the volume of the mold when completely closed.

The cloth covering on the outside of the tin foil wrapper serves to prevent the tin foil from breaking when the cheese is put under pressure in the mold. The cloth covering also acts to press the tin foil close up against the cheese surfaces, thereby forcing the air out from between the cheese and the tin foil wrapper. The reticulated structure of the cloth doubtless assists this outflow of air to some extent as the reticulations are printed or impressed on the tin foil. This also assists in getting close adhesion to the cheese surfaces. The air does not pass out through the tin foil which is substantially impervious but escapes through the seams or laps of the tin foil wrapper.

When the cheese is locked in compressed form within the mold, the mold is placed within a room having an initial temperature of approximately one hundred degrees Fahrenheit (100° F.). The temperature is then gradually increased to about one hundred and thirty degrees Fahrenheit (130° F.), and this treatment continued several hours, usually from three to twelve hours, varying somewhat with the season. The heat causes the compressed cheese to expand materially increasing the compression so that any air remaining in the wrapping escapes between the folds of the tin foil wrapper. With the heating and expansion of the cheese a quantity of butter-fat exudes on the surfaces of the cheese and serves as a preservative sealing medium between the cheese and the tin foil, keeping the cheese from molding. The tin foil being pressed close to the cheese effectively seals the surfaces of the cheese and keeps said surfaces moist, thereby preventing the formation of a rind and retains the moisture within the cheese indefinitely, improving the keeping quality of the cheese.

After a cheese compressed within an individual mold has been gradually heated as before described, it is left to gradually cool in the mold. The cheese is then removed from the mold and the cloth covering is now removed from the cheese, leaving the tin foil wrapper in place, and the cheese may now be boxed for sale.

The finished cured cheese 10 is sold in its tin foil wrapper which is permitted to remain in place. When it is desired to use the cheese, the cheese cutter or knife cuts right through the tin foil wrapper, thereby leaving only one cut surface of the cheese exposed to the air. The individual cheeses may be of any desired size and shape, the oblong shape, disclosed in the drawings being convenient form.

The improved process of forming a cheese without a rind eliminates all waste and virtually produces a cheese of substantially unitform quality all portions of which are edible.

I am aware that numerous details of my process, particularly temperatures and time periods, may be varied through a wide range without departing from the principles of this invention, and I therefore do not purpose limiting the patent granted otherwise than necessitated by the prior art.

I claim as my invention:

1. The process of making a cheddar cheese without a rind, said process consisting of cutting a larger cheese into a plurality of cheeses of predetermined size, individually wrapping the cheeses in tin foil, then applying to each wrapped cheese a cloth wrapper, next compressing the doubly wrapped cheeses in individual molds, then subjecting the filled molds to heat and allowing the cheeses to cool within the molds, then removing the cheeses from the molds and taking off the cloth wrappers and retaining in place the tin foil wrapper closely adherent to the cheese.

2. The process of forming a cheddar cheese without a rind, by wrapping a piece of cheese in a tin foil wrapper, surrounding the tin foil wrapper by a cloth wrapper, compressing the doubly covered cheese in a mold whereby the cloth acts to press the tin foil closely against the surfaces of the cheese and to force out any air from between the cheese and the tin foil wrapper, placing the mold with the cheese in a room having a temperature of approximately 100° F., and then gradually raising the temperature in said room to about 130° F., then allowing the cheese to cool in the mold, then removing the cheese from the mold and the cloth wrapper from the cheese, and finally retaining the cheese in its tin foil wrapper.

3. The process of forming a cheddar cheese consisting of wrapping a piece of cheese in tin foil and covering the tin foil wrapper with a cloth wrapper, pressing the wrapped cheese in a mold to force the air from between the cheese and the tin foil wrapper, subjecting the wrapped cheese while under compression to a gradually increasing temperature, and then permitting the cheese to cool in the mold, then removing the cheese from the mold and the cloth wrapper only.

4. The process in cheese making, comprising investing the cheese in a metallic covering, wrapping the invested cheese with cloth, applying pressure to the wrapped cheese and then subjecting the wrapped cheese to heat while compressed to expand the cheese, and then permitting the compressed cheese to cool in its wrappers and finally removing the cloth covering.

5. The process of forming a rindless cheese by investing the cheese in a plurality of wrappers of different materials one of which is impervious, compressing the wrapped cheese in a mold, placing the mold in a room and gradually increasing the temperature in the room, allowing the cheese to cool in the mold, and then removing the wrapped cheese from the mold to allow the cheese to be set away after first removing the outer wrappers.

6. The process of forming a rindless cheese by wrapping a piece of green cheese in a metallic wrapper, surrounding the metallic wrapper by a non-metallic covering, compressing the doubly wrapped cheese in a mold to force the air from between the cheese and the metallic wrapper, placing the mold in a room having a predetermined temperature, then gradually increasing the temperature of the room to expand the cheese and cause the formation of a sealing medium between the cheese surfaces and the metallic wrapper, then permitting the cheese to gradually cool in the mold, and then removing the cheese from the mold taking off the non-metallic covering and leaving the metallic wrapper in place.

7. A cheese making process consisting of wrapping a cheese in metallic and fabric coverings, compressing the covered cheese, subjecting the covered cheese while under compression to a gradually increasing temperature, then leaving the cheese cool in the coverings, and finally removing the fabric covering.

8. A cheese making process consisting of first wrapping a cheese in a metallic covering, then applying a fabric covering around the metallic covering, compressing the wrapped cheese, then subjecting the wrapped cheese while under compression to heat to force air from within the coverings, expand the cheese to increase the pressure and cause the exuding of a preservative sealing medium from the cheese, then permitting the covered cheese to cool, and finally removing the fabric covering.

9. A process of cheese making consisting of subjecting a cheese wrapped in a metallic impervious covering to heat while under pressure to cause the expulsion of the air from within the covering and the exuding of a preservative sealing medium over the surfaces of the cheese.

10. A process of cheese making consisting in wrapping a cheese in an impervious covering which is afterwards bonded to the cheese by subjecting the wrapped cheese to pressure and then to heat.

11. A process of cheese making consisting in first wrapping a cheese in an impervious covering, then wrapping the invested cheese in a pervious wrapper, and then subjecting the doubly wrapped cheese first to pressure and then to heat.

In testimony whereof I have hereunto subscribed my name in the presence of two subscribing witnesses.

JULIUS R. MEYERS.

Witnesses:
CHARLES W. HILLS, Jr.,
JAMES M. O'BRIEN.